April 14, 1964  N. E. O'CONNOR ETAL  3,128,672
WELDING ELECTRODE DRESSING MEANS
Filed Sept. 21, 1961  4 Sheets-Sheet 1
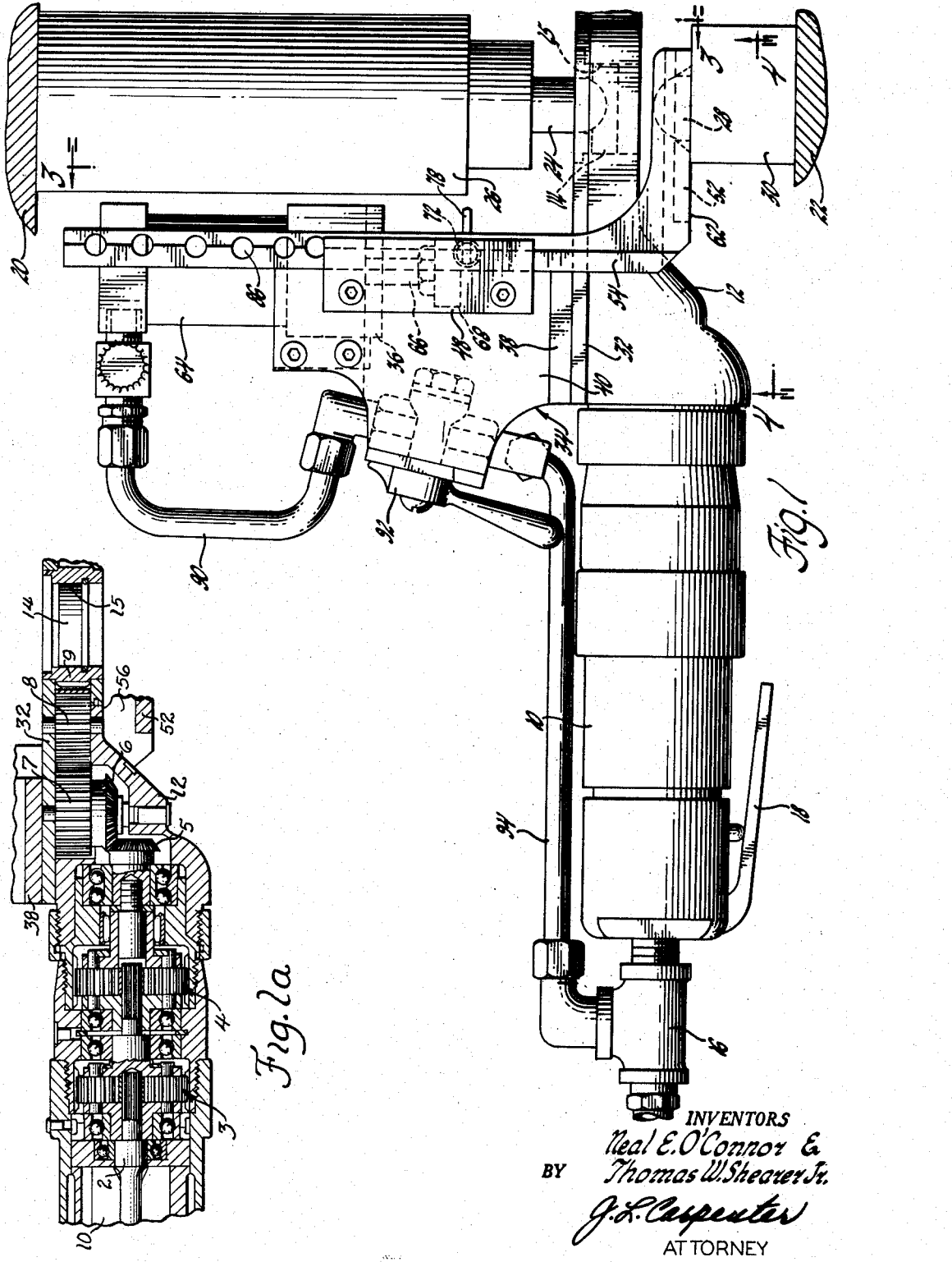
INVENTORS
Neal E. O'Connor &
BY  Thomas W. Shearer Jr.
J. L. Carpenter
ATTORNEY

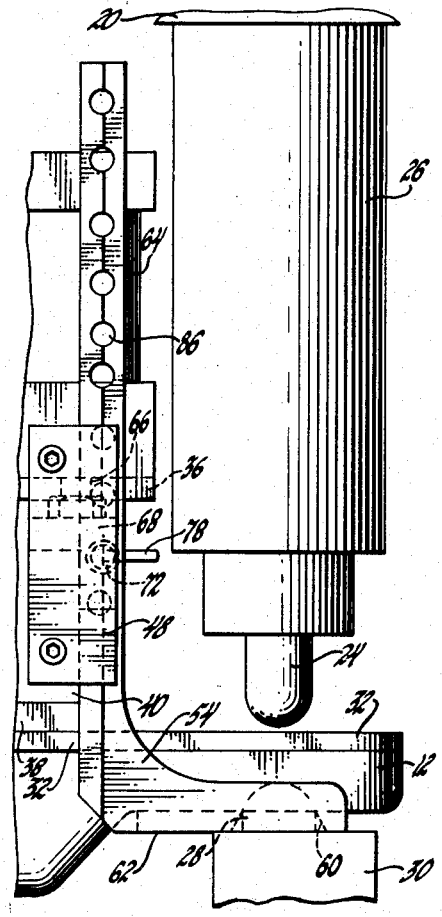

April 14, 1964 N. E. O'CONNOR ETAL 3,128,672
WELDING ELECTRODE DRESSING MEANS
Filed Sept. 21, 1961 4 Sheets-Sheet 3
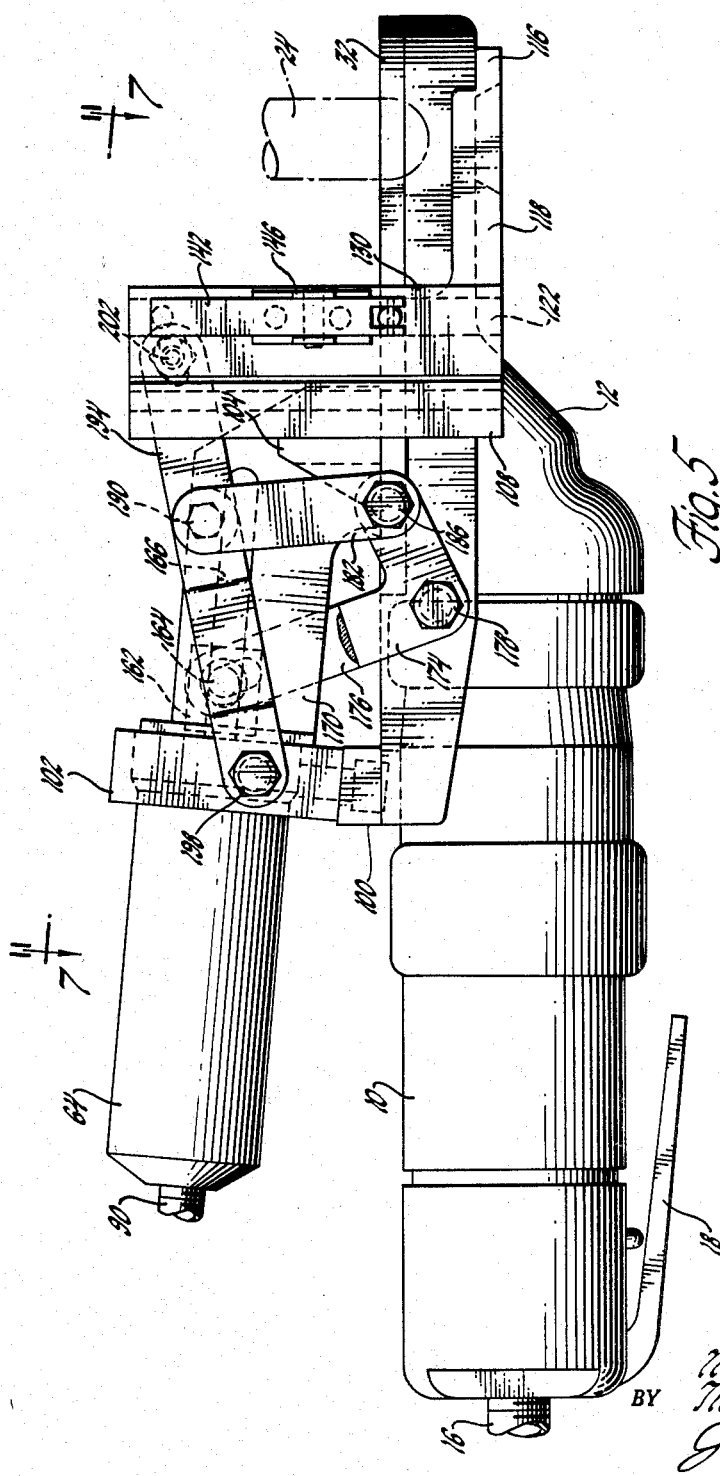
INVENTORS
Neal E. O'Connor &
BY Thomas W. Shearer Jr.
J. L. Carpenter
ATTORNEY INVENTORS
Neal E. O'Connor &
BY Thomas W. Shearer Jr.

ATTORNEY 3,128,672
WELDING ELECTRODE DRESSING MEANS
Neal E. O'Connor, Birmingham, and Thomas W. Shearer, Jr., Auburg Heights, Mich., assignors to General Motors Corporation, Detroit, Mich., a corporation of Delaware
Filed Sept. 21, 1961, Ser. No. 139,673
8 Claims. (Cl. 90—12)

This invention relates to welding equipment and more particularly to a welding electrode dressing tool.

One of the main repair problems in spot welding operations involves maintenance of the welding electrode tips in a predetermined structural condition. In general, such welding electrodes comprise cylindrical body portions which terminate in semispherical surfaces. The exact configuration of the electrode end is designed to obtain quality welds. In order to obtain quality welds, a welding electrode is designed to contact a predetermined workpiece area with a predetermined force and at a predetermined weld current. Very slight variations in the workpiece area contacted by the welding electrode will produce defective welds. During welding operations, the electrode ends tend to become deformed by a flattening and outward mushrooming of the electrode tip. In this manner, the contact area of the welding electrode with the workpiece is varied and variations in welding quality result.

In order to maintain welding quality, it is common practice to redress the electrode at suitable intervals to maintain the desired welding electrode tip configuration. The welding electrodes are commonly mounted in welding presses and the practice is to redress the electrodes in the welding press to eliminate as much down time of the welding operation as possible. In many cases, the down time required for a redressing operation is so valuable that the electrode redressing operations are seldom performed as often as is desirable and may be relegated to such times as the welding equipment is shut down for other reasons. The necessity of the redressing operation can be forestalled for some period of time by increasing weld current and welding force; but at a loss of optimum welding conditions. Even when time is found to redress the electrodes, presently known apparatus is cumbersome and usually requires more than one man for operation thereof. Conventional air powered tools having cutters designed to redress the electrode tips are commercially available.

The object of this invention is to provide new and improved apparatus for redressing welding electrode tips in welding installations. A further object of this invention is to provide electrode dressing apparatus which is more convenient to operate and requires less time to perform an electrode dressing operation. Other objects and advantages of the present invention may be known by reference to the following detailed description and the accompanying drawings wherein:

FIGURE 1 is a side elevational view of an illustrative embodiment of the present invention;

FIGURE 1a is a side view of a portion of FIGURE 1 with sections cut away to show the gear train from the air motor to the cutting tool;

FIGURE 2 is a partial view of the apparatus shown in FIGURE 1 in another position;

FIGURE 3 is a sectional view taken along the line 3—3 in FIGURE 1;

FIGURE 4 is a sectional view taken along the line 4—4 in FIGURE 1;

FIGURE 5 is a side elevational view of an alternative embodiment of the present invention;

Figure 6:
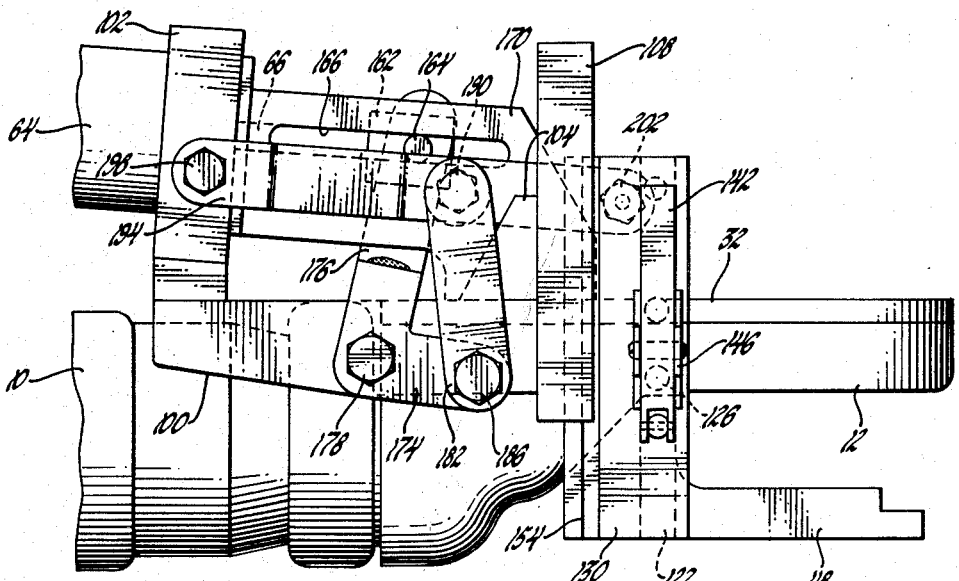
FIGURE 6 is a partial side elevational view of the apparatus shown in FIGURE 5 in another position.

Referring now to FIGURES 1-4, a conventional air powered dressing tool comprising an air powered motor 10 and a dressing head 12 containing a cutting tool 14 within a cavity 15 is connected to a suitable air source through a conduit 16 and a control valve actuated by a control handle 18. As best seen in FIGURE 1a, the rotor 2 of the air motor 10 drives the auxiliary gearing 3 which in turn is operably connected to the drive gearing 4 which drives bevel gear 5 in meshing engagement with bevel gear 6. The adjacent portion of bevel gear 6 is formed as a spur gear 7 which transmits the drive through a meshing spur gear 8 to the retainer assembly 9 in which the cutting tool 19 is fixedly mounted for rotation therewith. The dressing tool is shown in dressing position between an upper platen 20 and a lower platen 22 of a conventional welding press having a series of welding units comprising an upper welding electrode 24 mounted in a support cylinder 26 and a lower electrode 28 supported on an electrode back-up 30. In many welding applications, a back-up plate is substituted for the lower electrode. In any event, the present apparatus may be utilized for either upper or lower electrodes by reversing the position thereof.

The improvement comprises the provision of a support plate 32 on the upper surface of the dressing head 12 on which a support bracket 34 is fixedly secured. The support bracket is illustrated in FIGURE 3 as comprising upper and lower support plates 36, 38 between which a pair of spaced vertical side plates 40, 42 extend. Vertical guideways 44, 46, shown in FIGURE 4, are formed along each of the side plates 40, 42 by guide blocks 48, 50. A tool locating and support plate 52 is mounted between a pair of vertically parallelly extending support arms 54, 56 which are slidably supported within the guideways 44, 46. The plate 52 is provided with a transverse groove 58 which terminates in a seat defined by an arcuate surface 60 adapted to be seated against the lower electrode 28, or other back-up member, when the dressing tool is in operating position. The bottom surface 62 of the plate 52 is adapted to abut and be supported on the upper surface of the back-up member 30.

In order to vertically extend the support and locating plate 52 relative to the bracket 34, a conventional single stroke air cylinder 64 with a spring return 65 is mounted on the upper plate 36 and is provided with a piston rod 66 which extends downwardly through the plate 36 and is attached to a connecting block 68. A bore 70 extends transversely of the connecting block 68 and slidably receives locking pins 72, 74 which are outwardly biased by a compression spring 76. The locking pins 72, 74 are slidably movable within the bore 70 against the bias of the compression spring 76 by means of slide pins 78, 80 which protrude outwardly through slots 82, 84. The locking pins 72, 74 are adapted to be received within a plurality of aligned locking holes 86, 88 provided in the support arms 40, 42. The cylinder 64 is connected by a conduit 90 through a conventional control valve 92 and a conduit 94 to the high pressure air line 16.

Figure 7:
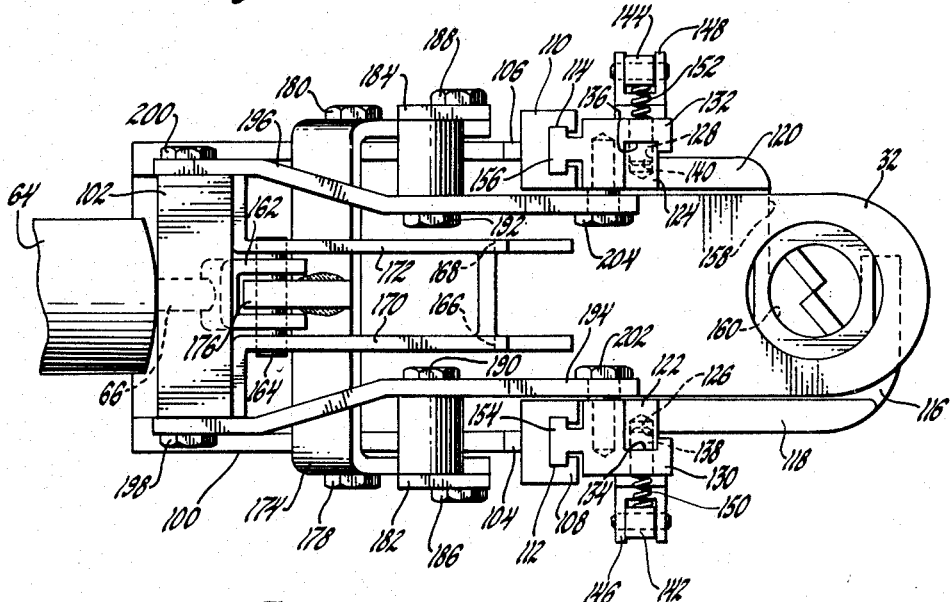
FIGURE 7 is a plan view taken along the line 7—7 in FIGURE 5.

Referring now to FIGURES 5-7, an alternative embodiment of the present invention is illustrated and comprises a bracket 100 fixed to the support plate 32. Referring particularly to FIGURE 7, the bracket is provided with an air cylinder support plate 102 at one end and spaced guide plate supports 104, 106 at the other end. Vertically extending guide blocks 108, 110 are secured to the support plates 104, 106 and are provided with vertically extending guideways 112, 114. A locating and support plate 116 is secured between a pair of L-shaped support arms 118, 120 having parallelly vertically extending support arms 122, 124 provided with a plurality of vertically spaced locking holes 126, 128. Slide blocks 130, 132 slidably receive the arms 122, 124 in slots 134, 136 and are secured thereto by means of locking pins 138, 140 which are slidably supported within the slide blocks 130, 132 and adapted to be received by the locking holes 126, 128. The pins 138, 140 are actuated by levers 142, 144 which are pivotally mounted on brackets 146, 148 and biased toward a locking position by spring elements 150, 152. The slide blocks 130, 132 are provided with slide portions 154, 156 which are slidably received within the guideways 112, 114. The locating and support plate 116 is provided with a transverse slot 158 which terminates in an arcuate surface 160 adapted to abuttingly locate the dressing tool relative to a lower electrode of a weld press or other locating element as hereinbefore described.

A conventional air powered control cylinder 64 is mounted in a substantially horizontal position on the support plate 102 and the piston rod 66 thereof extends through the plate and is connected through a clevis 162 to a drive pin 164. The drive pin 164 is slidably mounted in parallel guide slots 166, 168 provided in a pair of parallelly spaced plates 170, 172 which are secured to the cylinder support plate 102 and supported by the plate 32. A bell crank link 174 is pivotally connected to the drive pin 164 by a connecting arm 176 and is pivotally connected at 178, 180 to the bracket 100. Drag links 182, 184 are pivotally connected at 186, 188, respectively, to the bell crank 174 and are pivotally connected at 190, 192, respectively, to drive links 194, 196. The drive links 194, 196 are pivoted at 198, 200, respectively, to the cylinder support 102 and at 202, 204, respectively, to the slide blocks 130, 132.

In operation of the embodiment shown in FIGURES 1–4, the dressing tool is first positioned between the upper and lower electrodes 24, 28 by maneuvering the support and locating plate 52 onto the upper surface of the electrode back-up 30 and locating the lower electrode within the slot 58 in abutting engagement with the arcuate seat 60. The valve 92 is then actuated to admit high pressure air to the cylinder 64 through the conduit 90. The amount of air reaching the cylinder can be variably controlled by the valve to vary the force exerted by the cutting tool on the electrode. The piston rod 66 is thereby extended to move the drive block 68 and the connected support arms 54, 56 downwardly in the guideways 44, 46 of the guide blocks 48, 50. Since the guide arms 54, 56 are abuttingly supported on the electrode back-up 30 by the plate 52, the cylinder 10 and dressing head 12 are moved upwardly to locate the cutting tool 14 in cutting position against the upper electrode 24 as shown in FIGURE 1. In this manner, the dressing tool is rigidly supported within the welding press relative to the upper electrode 24 which is to be redressed. When the tool is in the position shown in FIGURE 1, the control handle 18 may be actuated to operate the motor 10 and drive the cutting tool 14 in the conventional manner. The guide arms 54, 56 are made adjustable relative to the guide blocks 48, 50 by means of the locking pins 72, 74 and locking holes 86, 88 so that the tool may be readily adapted for use in welding presses of varying sizes.

The alternative embodiment shown in FIGURES 5–7 is operated in a similar manner. The support and locating plate 116 is maneuvered onto the lower electrode back-up and the lower electrode is positioned within the slot 158 in abutting engagement with the seat 160. The cylinder 64 is then actuated to move the dressing head 12 upwardly into dressing position relative to the upper electrode 24. The dressing head 12 is moved relative to the support and locating plate 118 by driving movement of the pin 164 from the position shown in FIGURE 5 to the position shown in FIGURE 6 which causes vertical oscillation of the drive links 194, 196 by driving action of the drag links 182, 184 and the bell crank 174. The amount of relative movement between the support and locating plate 118 and dressing head 12 may be varied by adjustment of the support arms 122, 124 relative to the slide block 130, 132. The adjustment is accomplished by actuation of the control levers 142, 144 to move the locking pins 138, 140 from within the locking bores 126, 128 so that the slide blocks can be moved relative to the support arms.

It is to be understood that the aforedescribed apparatus is, in many respects, merely illustrative of a variety of constructional details and arrangements of the parts which may be utilized to accomplish similar results. Accordingly, it is intended to include obvious modifications within the scope of the appended claims, except insofar as limited by the prior art.

In the claims:

1. Apparatus for dressing welding electrodes in a welding press and comprising an electrode dressing tool, said electrode dressing tool having a dressing head in which a cutting tool is mounted for cutting engagement with a welding electrode, bracket means fixed to said dressing head and extending outwardly therefrom, guideway means formed on said bracket means, slide means slidably supported in said guideway means for movement in a path parallel to the central axis of the cutting means on said dressing tool and the central axis of the electrode to be dressed, locating and support means fixedly secured to said slide means, power means to actuate said slide means and cause relative movement between said support and locating means and said cutting means, and said support and locating means being spaced and positioned in alignment with said cutting means to rigidly support said dressing tool relative to said electrode when said cutting tool is engaged with said electrode.

2. The apparatus as defined in claim 1 and wherein said power means comprises a power cylinder mounted on said bracket and having piston rod means drivingly connected with said slide means.

3. The apparatus as defined in claim 2 and wherein said power cylinder and said piston rod means have a central axis extending substantially parallelly to the central axis of the cutting means, and pin means connecting said piston rod means to said slide means.

4. The apparatus as defined in claim 3 and wherein said slide means includes a plurality of spaced pin receiving means, and said pin means includes releasable means to permit said pin means to be connected to said slide means by association with varying ones of the pin receiving means to obtain variations in the amount of relative movement between said support and locating means and said cutting means.

5. The apparatus as defined in claim 2 and wherein said power cylinder and said piston rod means are positioned so that the central axis thereof extends substantially transversely to the central axis of said cutting means, and connecting means connecting said piston rod means to said slide means.

6. The apparatus as defined in claim 5 and wherein said connecting means comprises linkage including, a bell crank pivotally connected to said piston rod means, drive link means pivotally connected to said slide means, and said bell crank being pivotally connected to said drive link means to transfer reciprocable motion of said piston rod means substantially transverse to the central axis of said cutting means to reciprocable motion of said slide means substantially parallel to the central axis of said cutting means.

7. In combination with a dressing tool for dressing welding electrodes mounted in a welding apparatus, said dressing tool having a cutting tool adapted for engagement with an electrode and a first power means operably connected to said cutting tool for driving the cutting tool, an improvement comprising; power operable means for fixedly locating and rigidly supporting said dressing tool relative to said electrode for the dressing of said electrode by said power driven cutting tool, said power operable means including a locating and support means comprising, a plate having a locating slot and an electrode abutment surface for abutting and seating on back-up means spaced from said electrode on said welding apparatus, slide means secured on said dressing tool for slidably supporting said locating and support means relative to said dressing tool, and a second power means operably interconnecting said locating and support means and said slide means for moving said locating and support means relative to said dressing tool as said cutting tool is moved into rigid engagement with said electrode and said locating and support means abuts said back-up means.

8. In combination with a power driven dressing tool for dressing welding electrodes operatively mounted in a welding apparatus, an adjustable power operable means for locating and rigidly supporting said dressing tool in dressing position, last said means including a bracket means secured to said dressing tool, a locating and support means spaced from said dressing tool and movably connected to said bracket means, guide means on said bracket means for accommodating said locating and support means for movement relative to said bracket means and said dressing tool, power actuating means secured to said bracket means for moving said locating and support means, adjusting means for adjustably connecting said power actuating means to said locating and supporting means for varying the space between said dressing tool and said locating and supporting means whereby the initial distance between the dressing tool and the locating and supporting means may be varied prior to movement of the locating and supporting means by the power actuating means.

References Cited in the file of this patent

UNITED STATES PATENTS

| | | |
|---|---|---|
| 2,300,173 | Platz | Oct. 27, 1942 |
| 2,357,038 | Whitesell | Aug. 29, 1944 |
| 2,503,382 | Fisher | Aug. 11, 1950 |
| 2,638,817 | Hall | May 19, 1953 |
| 2,930,289 | Swarts | Mar. 29, 1960 |